(12) United States Patent
Tanagawa

(10) Patent No.: US 6,175,881 B1
(45) Date of Patent: Jan. 16, 2001

(54) MICROCONTROLLER HAVING A MEMORY, A DEDICATED MULTITASK MEMORY, AND SWITCHING CIRCUIT FOR SELECTIVELY CONNECTING THE MULTITASK MEMORY TO THE INTERNAL OR EXTERNAL BUS

(75) Inventor: Kouji Tanagawa, Tokyo (JP)

(73) Assignee: Oki Electric Industry Co., Ltd., Tokyo (JP)

( * ) Notice: Under 35 U.S.C. 154(b), the term of this patent shall be extended for 0 days.

(21) Appl. No.: 09/038,836

(22) Filed: Mar. 12, 1998

(30) Foreign Application Priority Data

May 28, 1997 (JP) ................................. 9-154590

(51) Int. Cl.[7] ................................. G06F 13/10
(52) U.S. Cl. ............................. 710/7; 711/163; 711/150; 358/296; 370/351; 710/20
(58) Field of Search .................. 711/163, 150; 358/296; 370/351; 710/20, 7

(56) References Cited

U.S. PATENT DOCUMENTS

| | | | |
|---|---|---|---|
| 4,827,406 | * | 5/1989 | Bischoff et al. ............ 364/200 |
| 4,953,930 | * | 9/1990 | Ramsey et al. ............ 357/40 |
| 5,276,799 | * | 1/1994 | Rivshin ............ 358/296 |
| 5,490,279 | * | 2/1996 | Golbert et al. ............ 364/228 |
| 5,799,207 | * | 8/1998 | Wang et al. ............ 370/351 |
| 5,864,692 | * | 1/1999 | Faraboschi et al. ............ 711/163 |

FOREIGN PATENT DOCUMENTS

| | | |
|---|---|---|
| 7-210449 | 5/1985 | (JP) . |
| 3-105440 | 5/1991 | (JP) . |
| 5-274154 | 10/1993 | (JP) . |

* cited by examiner

Primary Examiner—Thomas C. Lee
Assistant Examiner—Thu-Huong Vuong
(74) Attorney, Agent, or Firm—Wenderoth, Lind & Ponack, L.L.P.

(57) ABSTRACT

A microcontroller comprising a first memory 2 used by a CPU1 to perform arithmetic operations; a second memory 3 for a multitask process for storing data transferred from an external device 30 during the arithmetic process of CPU1; bus switches 4 and 5 for switching over the connection of data buses of CPU1 and the external device 30; and an address supply portion 7, which is connected to the address bus of the external device 30 while the second memory 3 is connected to the data bus of the external device 30, and which generates address signals by which to store data from the external device, wherein this microcontroller can perform a multitask process without adopting an expensive device such as a dual port RAM.

2 Claims, 5 Drawing Sheets

STEP S1

STEP S2

STEP S3

Fig. 5

| | P1 | P2 | K J | T | Q "Q" | AND1 | AND2 OR1 | OR1 | BUS SW4 | BUS SW5 | AND3 | AND4 | OR2 |
|---|---|---|---|---|---|---|---|---|---|---|---|---|---|
| STEP S1 | 0 | 0 | 0 1 | 1 | 0 1 | ON | OFF | ON | OFF | ON | ON | OFF | ON |
| STEP S2 | 0 | 1 | 1 1 | 1 | 1 0 | OFF | ON | ON | OFF | ON | OFF | ON | ON |
| STEP S3 | 1 | 0 | 1 0 | 1 | 1 0 | ON | OFF | ON | ON | OFF | ON | OFF | ON |
| STEP S4 | 0 | 0 | 1 0 | 1 | 0 1 | ON | OFF | ON | OFF | ON | ON | OFF | ON |

MICROCONTROLLER HAVING A MEMORY, A DEDICATED MULTITASK MEMORY, AND SWITCHING CIRCUIT FOR SELECTIVELY CONNECTING THE MULTITASK MEMORY TO THE INTERNAL OR EXTERNAL BUS

BACKGROUND OF THE INVENTION

1. Technical Field

The present invention relates to a microcontroller suitable for a multitask process for receiving data from an external device during an arithmetic operation of the CPU (central processing unit) using data from a memory device.

2. Prior Art

Multitasking is well known as a method of improving the computing speed of a computer. In a computer performing a multitask process, for example, a write operation of data from the external device to another location of the main memory takes place simultaneously with the arithmetic process of the CPU (central processing unit) using a part of the main memory.

The control of a multitask operation can be achieved either by software or hardware. In the control by software, however, the main memory region is taken up by a control program, so that hardware control is often adopted to meet the requirement of more effective use of the memory.

The techniques for executing multitasking by hardware have been revealed by literature as follows.

Literature (1) JP-A-5-274154, Program Load Method and Memory Back-up Method

Literature (2) JP-A-7-210449, Dual Port RAM Access Circuit

Literature (3) JP-A-3-105440, Shared Memory Access Method The literature (1) discloses a case where a dual port RAM for the main memory is divided in its application. Specifically, the serial memory portion of the RAM is dedicated to DMA (direct memory access) and the random access memory portion is dedicated to the CPU.

The literature (2) discloses a structure that while the CPU accesses the first memory region of the dual port RAM, the data processing circuit can access the second memory region.

The literature (3) discloses a structure that a free memory bank can be used as a memory region accessible by another processor.

Meanwhile, the prior-art techniques mentioned above have the following problem. In those methods that use the dual port RAM in a subdivided form as indicated in literatures (1) and (2), it is necessary to control a plurality of subdivisions of the dual port RAM, so that the peripheral circuits have to be in complicated configurations. Therefore, those methods are not suitable for forming a less expensive microcontroller in a less expensive configuration.

The method using memory banks as indicated in literature (3) lacks in operational facility because data must be input or output to and from the memory by using another processor.

SUMMARY OF THE INVENTION

To solve the above problem, the present invention adopts the following arrangement.

<Arrangement 1>

According to the present invention, there is provided a microcontroller having a memory connected to the CPU through a data bus and an address bus, comprising:

a memory for a multitask process separate from the above-mentioned memory;

data bus switching means for switching, by control of the CPU, the connection of the multitask-process memory either to the above-mentioned data bus or a data bus leading to an external device;

address bus switching means for switching, by control of the CPU, the connection of the multitask-process memory either to the address bus or to an address bus for the external device; and address supply means for generating and supplying address signals used to store data sent from the external device in the multitask-process memory connected both to the data bus of the external device and the address bus data.

<Arrangement 2>

In the microcontroller according to the present invention, the address supply means, connected with a clock oscillator to output a clock signal at a frequency same as the operation clock frequency of the external device, supplies an address signal in synchronism with the external device.

BRIEF DESCRIPTION OF THE DRAWINGS

FIG. 5 is an explanatory diagram showing the truth table of the present invention.

DESCRIPTION OF THE PREFERRED EMBODIMENTS OF THE INVENTION

The present invention will be described with reference to embodiments depicted in the accompanying drawings.

Figure 1:
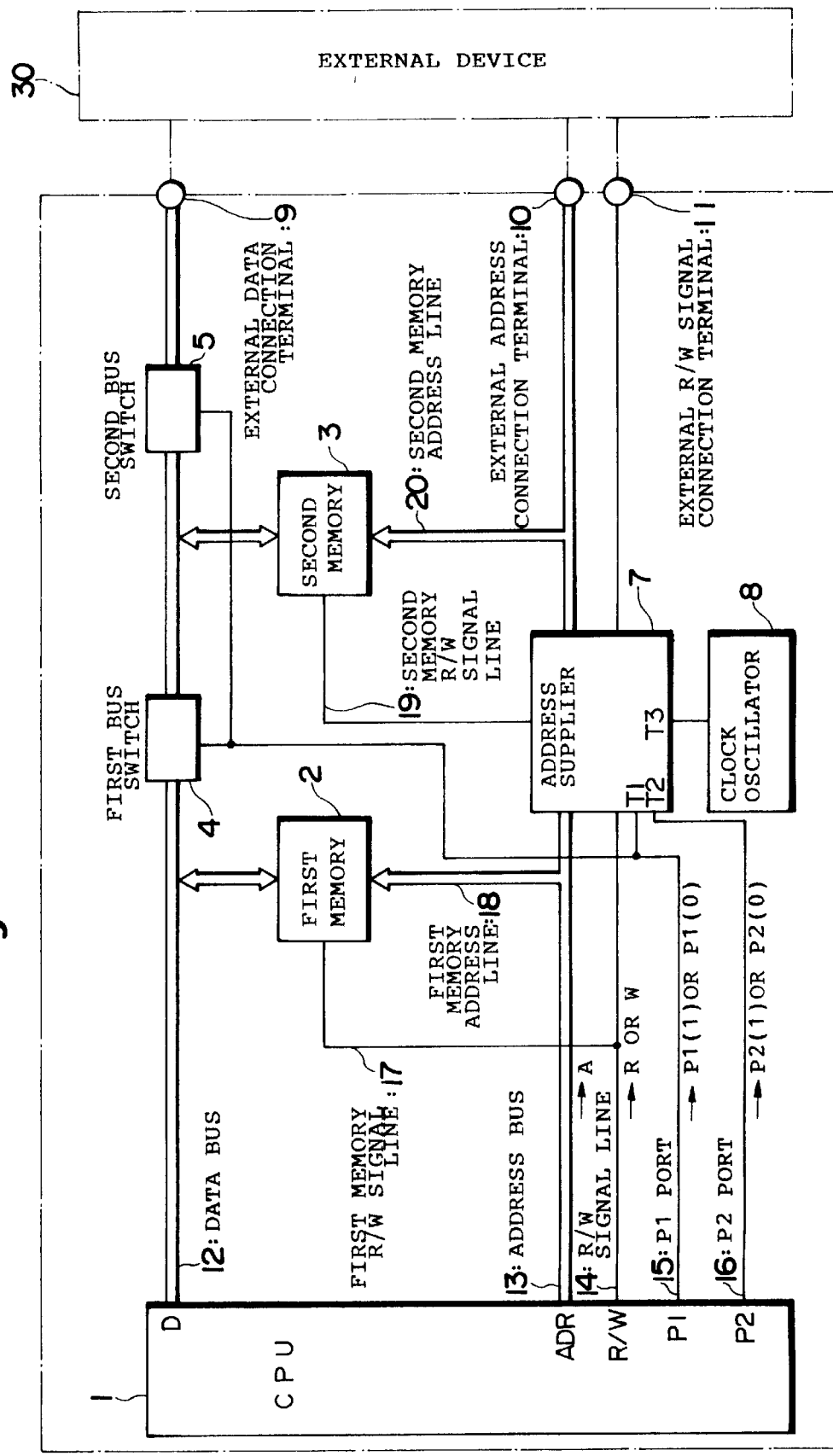
FIG. 1 is a block diagram of the microcontroller according to the present invention

FIG. 1 is a block diagram of the microcontroller according to the present invention.

The microcontroller in FIG. 1 comprises a CPU (Central Processing Unit), a first memory 2, a second memory 3, a first bus switch 4, a second bus switch 5, an address supplier 7, a clock oscillator 8, an external data connection terminal 9, an external address connection terminal 10, and an external R/W signal connection terminal 11.

To interconnect the above-mentioned components, the microcontroller according to the present invention further comprises a data bus 12, an address bus 13, a R/W signal line 14, a P1 port 15, a P2 port 16, a first memory R/W signal line 17, a first memory address line 18, a second memory R/W signal line 19, and a second memory address line 20. CPU1 is always connected to the first memory 2 through the data bus 12 and the address bus 13. The first bus switch 4 and the second bus switch 5 are connected in the data bus 12. The address supplier 7 is connected in the address bus 13.

The second memory 3, which is a memory for the multitask process, is connected to the data bus 12 between the first bus switch 4 and the second bus switch 5. The second memory 3 is also connected to the address bus 13 through the second memory address line 20 and between the address supplier 7 and the external address connection terminal 10.

The R/W signal line 14 is connected to the first memory 2 through the first memory R/W signal line 17, and is also directly connected to the address supplier 7. The P1 port 15 is connected to the first bus switch 4, the second bus switch 5, and the address supplier 7. The P2 port 16 is connected to the address supplier 7. The address supplier 7 is connected through the second memory R/W signal line 19 to the second memory 3, and the read and write operations on the second memory 3 are executed by a signal sent through this R/W signal line 19.

The first memory 2 is constantly connected to CPU1 through the data bus 12 and the address bus 13, and is a memory region exclusively accessible by CPU1.

The second memory 3 can be connected to CPU1 by control of CPU1, and is connected to the external device 30 through the external data connection terminal 9, the external address connection terminal 10, and the external R/W signal connection terminal 11. In other words, when CPU1 connect the second memory 3 to the external device 30, the second memory receives data from the external device 30 and is used to perform a multitask process.

CPU1 performs specified arithmetic and logic operations by using the first memory 2 or the second memory 3 as the main memory. The first memory 2, which is constantly connected to CPU1 as mentioned above, is formed by a RAM (Random Access Memory) or the like. Likewise, the second memory 3 is formed by a RAM (Random Access Memory).

The first bus switch 4 and the second bus switch 5 have a function to disconnect the data bus 12 from the second memory 3 or interconnect the data bus 12 with the second memory 3. The state of the data bus 12 being separated from the second memory 3 is referred to as the non-conducting state (hereafter written as OFF), and the state of interconnection of the data bus 12 with the second memory 3 is referred to as the conducting state (hereafter written as ON). These states are controlled by CPU1 outputting a switching control signal from the P1 port 15.

To be more specific, CPU1 performs switching control so as to turn off the second bus switch 5 when CPU1 turns on the first bus switch 4. On the other hand, CPU1 performs switching control so as to turn on the second bus switch 5 when CPU1 turns off the first bus switch 4. In the latter case, the second memory 3 is separated from CPU1, and is connected to the external device 30 through the external data connection terminal 9 to execute a multitask process.

As is clear from the above description, the first bus switch 4 and the second bus switch 5 are switched to the opposite states.

The address supplier 7 is a circuit having an address generating function to generate address signals supplied to the second memory 3 and a function to generate a R/W signal to control the second memory 3. This address supplier 7 generates addresses independently of the addresses generated by CPU1 while CPU1 is operating.

As described later, the address supplier 7 transfers data at a clock frequency different from that of CPU.

The clock oscillator 8 supplies the address supplier 7 with a clock signal, on the basis of which the address supplier 7 generates address signals.

When the first memory 2 and the second memory 3 are used together as the main memory, the address supplier 7 connects the address bus 13 directly through the second memory address line to the second memory 3.

When the second memory 3 is cut off from CPU1 and is connected to the external device 30 through the external data connection terminal 9, the address supplier 7 supplies independently generated address signals and a R/W signal to the second memory 3 through the second memory address line 20 and the second memory R/W signal line.

Figure 2:
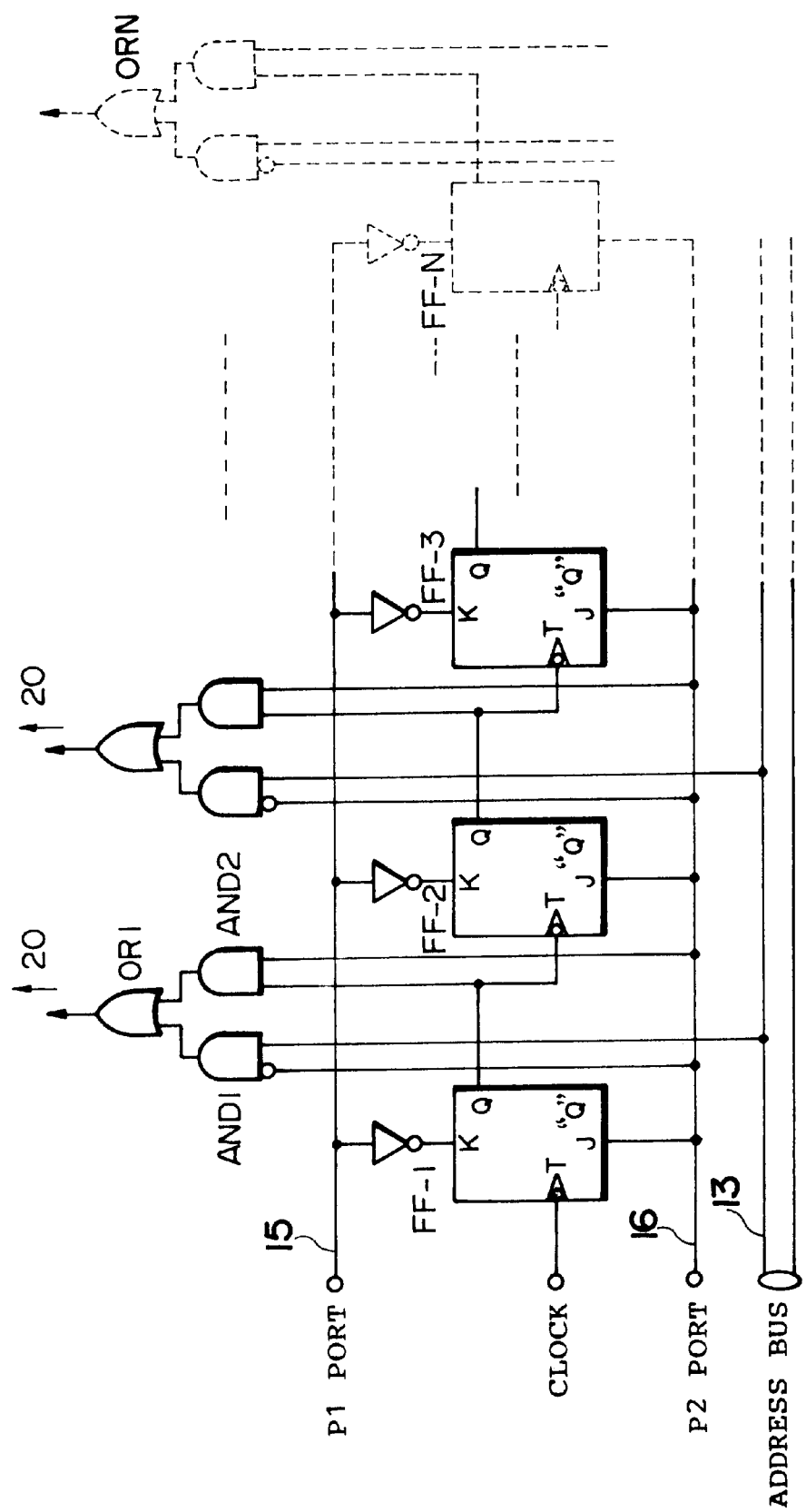
FIG. 2 is a diagram of the address generating circuit of the address supplier according to the present invention.

The address counting function of the address supplier 7 is realized by a circuit illustrated in FIG. 2.

FIG. 2 is an address generating circuit diagram of the address supplier 7.

The address generating circuit of the address supplier 7 includes flipflops FF-1, FF-2, FF-3 . . . FF-N. Those flip-flops form counter circuits, and generate digits of an address represented in binary. For example, a counter circuit is made up of a flip-flop FF-1, two AND gates AND1 and AND2, and an OR gate OR1 which produces the OR of outputs of the two AND gates.

The AND gate AND1 produces the AND of a signal from the P2 port 16 and an address signal on the address bus 13. The AND gate AND2 outputs the AND of the Q output of FF-1 and a signal from the P2 port 16.

Figure 3:
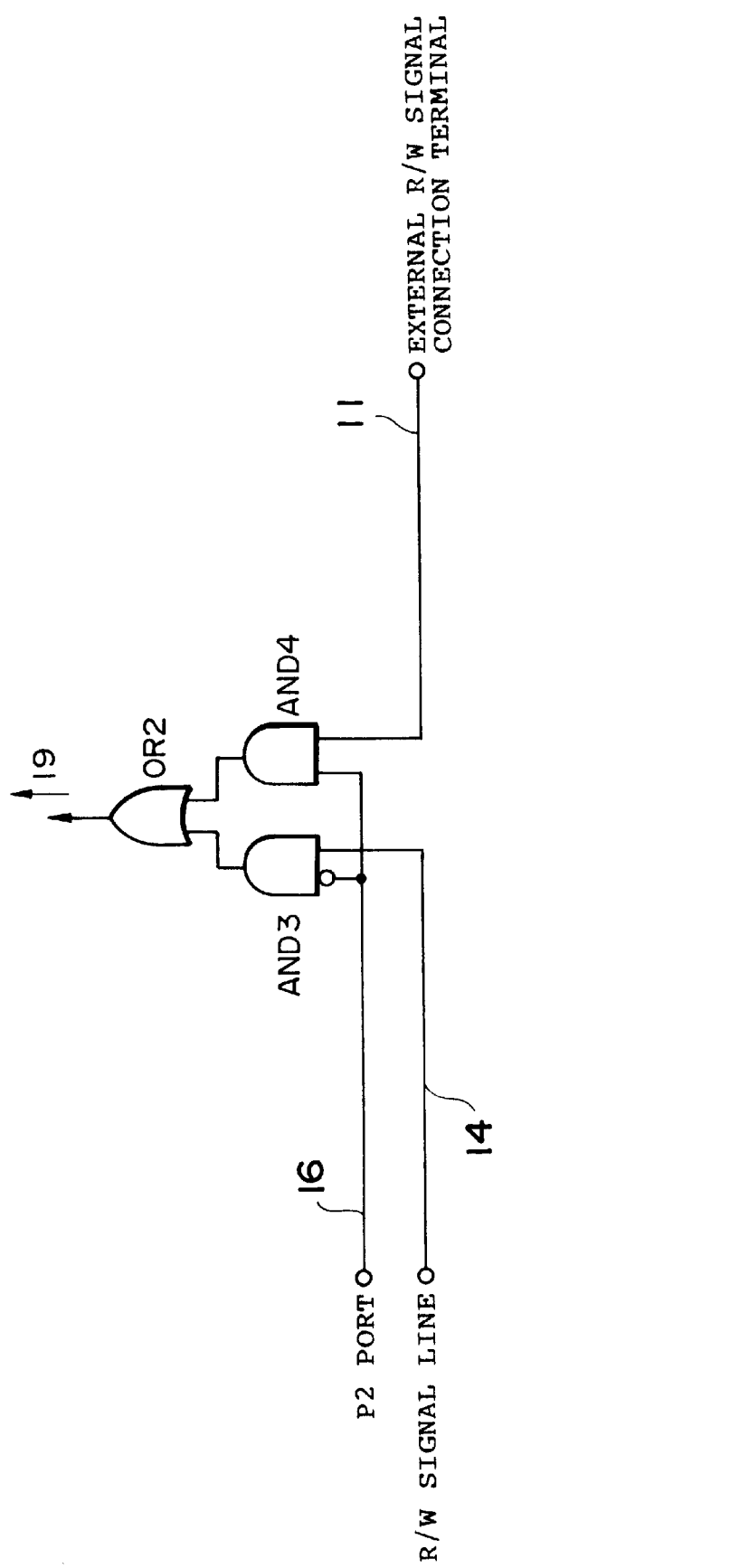
FIG. 3 is a diagram of the R/W signal generating circuit of the address supplier according to the present invention.

FIG. 3 is a R/W signal generating circuit diagram of the address supplier 7.

The R/W signal generating circuit diagram of the address supplier 7 consists of two AND gates AND3, AND4, and one OR gate OR2. The AND gate AND3 produces the AND of a signal from the P2 port 16 and a signal of the R/W signal line 14. The AND gate AND4 produces the AND of a signal from the P2 port 16 and a signal from the external R/W signal connection terminal 11. The OR gate OR2 carries out an OR operation between the outputs of the two AND gates.

The operation of the microcontroller according to the present invention formed as described will be discussed by referring to a series of operation steps.

The outline of the multitask operation using the second memory 3 will be described with reference to FIG. 1. In this description, the operation of the address supplier 7 is omitted. To be more specific, the multitask operation is first outlined and then the connection and switching operation of the second memory 3 of the address supplier 7 is described in detail.

FIG. 4 includes schematic explanatory diagrams showing the steps of the interconnection of the components of the microcontroller according to the present invention.

Figure 4A:
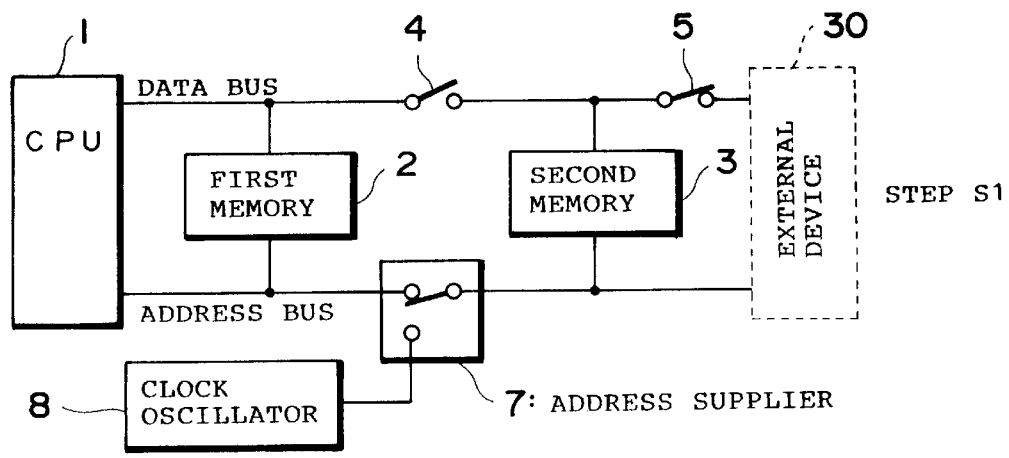
FIGS. 4a–4c are an explanatory block diagrams schematically showing the connections of the microcontroller according to the present invention.
Figure 4B:
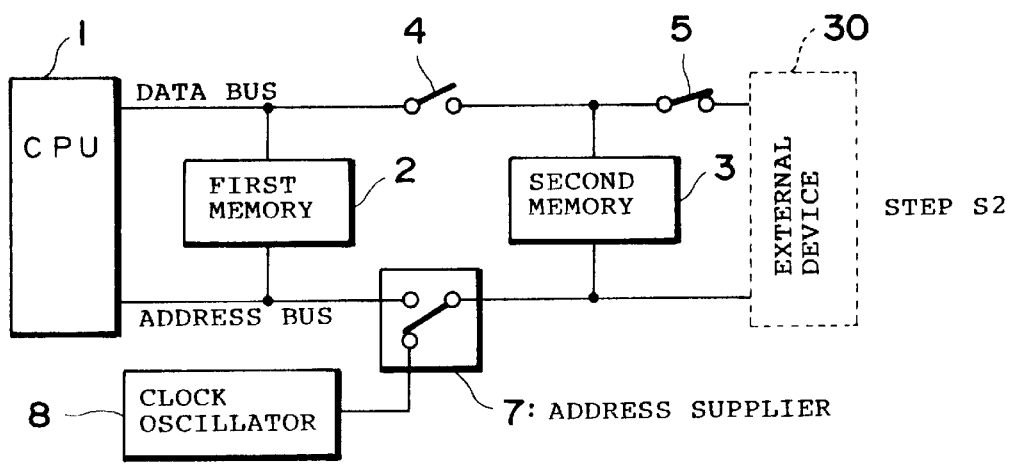
Figure 4C:
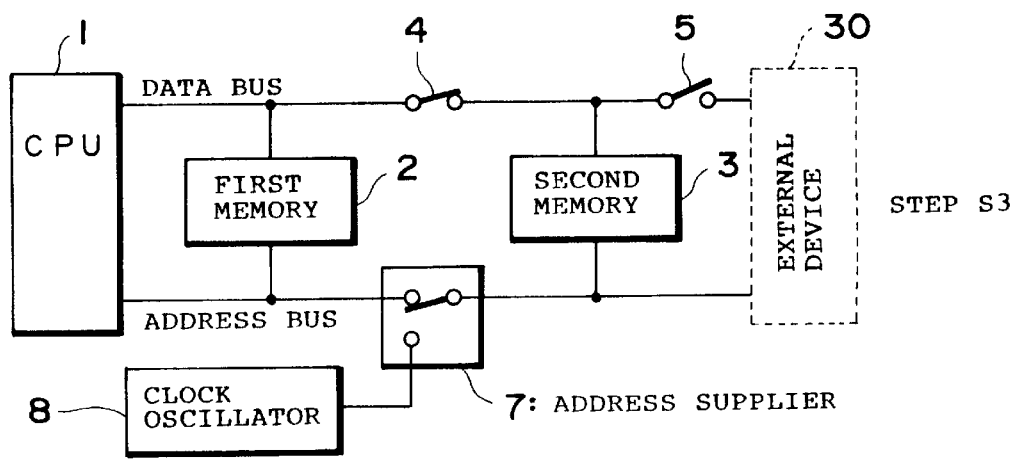

FIGS. 4(a), 4(b) and 4(c) are the schematic explanatory diagrams showing the interconnection in steps S1 to S3, which will be described in the following.

(Step S1 in FIG. 4(a))

In FIG. 1, the start switch of the microcontroller is turned on.

CPU1 starts to operate and outputs "0" from the P1 port 15 and the P2 port 16.

Under this condition, CPU1 switches the first bus switch 4 OFF, and the second bus switch 5 ON.

Therefore, the first memory 2 is connected to CPU1, and the second memory 3 to the external device 30. In other words, the second memory 3 is separated from the data bus 12.

At the same time, the address supplier 7 is reset by CPU1.

Under this connection relationship, CPU1 is in the state of being able to access the first memory 2, but CPU1 is unable to access the second memory 3. In short, the operation stage of the microcontroller is the reset stage.

(Step 2 in FIG. 4(b))

In step S2, CPU1 switches the output signal of the port P2 16 from "0" to "1" by predetermined software control.

When the output signal "1" is input to the T2 terminal, the address supplier 7 starts to increment the address from 0 to one and so on in step with the clock pulses generated by the clock oscillator 8 supplied through the T3 terminal. The address supplier 7 makes access through the second memory address line 20 to locations of the second memory 3 by incrementing the address. At the same time, the address supplier 7 internally cuts off the R/W signal line 14, and connects the second memory 3 with the external R/W signal connection terminal 11 through the second memory R/W signal line 19.

Under this condition, the second memory 3 is in the state of being able to receive data from the external device 30 through the external data connection terminal 9, the external address connection terminal 10, and the external R/W signal connection terminal 11. Therefore, while CPU1 has access to the first memory 2 and is performing arithmetic operations, the second memory 3 can store data obtained by access by the address supplier 7 to the external device 30.

Because the clock frequency of the clock oscillator 8 is not required to be the same as the clock frequency of the CPU1 operation, the clock frequency of the clock oscillator 8 is made to coincide with the clock frequency of the external device.

The addresses of the second memory 3 start with address 0 and the maximum value of address is a value determined by the number of bits of the counter circuit mentioned earlier.

(Step S3 in FIG. 4(c))

In Step S3, the interconnection of the microcontroller is such that CPU1 can access both the first memory 2 and the second memory 3. CPU1 switches the output of the P1 port 15 to "1" and the output of the P2 port 16 to "0" by predetermined software control. When the P1 port 15 is "1", the first bus switch 4 turns on and the second bus switch 5 turns off. Therefore, the second memory 3 is separated from the external device 30, and CPU1 is connected through the data bus 12 to the second memory 3.

At the same time, as the output of the P2 port 16 goes to the 0 level, the address bus 13 and the R/W signal line 14 are connected inside the address supplier 7 directly to the second memory 3 through the second memory address line 20 and the second memory R/W line 19.

Therefore, it is now possible for CPU1 to access the second memory 3, as well. Note that the clock frequency of the address supplier 7 is synchronized with that of CPU1.

Under this condition, CPU1 is in the state of being able to access both the first memory 2 and the second memory 3. Consequently, CPU1 can access data which has been transferred from the external device 30 and stored in the second memory 3 when the address supplier 7 accessed the external device 30 while CPU1 accessed the first memory 2 and conducted arithmetic operations.

(Step S4 in FIG. 4(a))

At this Step S4, the microcontroller returns to the reset state.

CPU1 switches the output of the P1 port 15 to "0" but keeps the output of the P2 port 16 at the 0 level.

This connection state is the same as in Step S1.

By repeating the above steps, a multitask process can be achieved.

(The actions in the Address Supplier 7)

Description will now be made of details of the connection switching actions for the second memory 3 by the address supplier 7 at respective steps.

FIG. 5 is an explanatory diagram of the truth table showing the actions at the respective steps.

Steps S1 to S4 at the left end of the table are the same steps as in the description of the outline of the multitask operation. Those action steps are switched over by CPU1 outputting "1" or "0" signals from the P1 port 15 and the P2 port 16.

As for the names at the uppermost spaces in the table, P1 and P2 denote the output signals of the P1 port 15 and the P2 port 16. K and J denote the control inputs to the JK flip-flop FF-1. T denotes clock signal inputs of the clock oscillator 8 (FIG. 1) to the flip-flop FF-1. Q and "Q" denote the output signals of the flip-flop FF-1. AND1, AND2, OR1 denote outputs of the address switching actions of the AND gates, etc. as parts of the address generating circuit (FIG. 2) of the address supplier 7. This table shows only the least significant digits of addresses. The bus switches 4 and 5 show their conducting states ON and non-conducting states OFF.

Moreover, AND3, AND4, and OR2 show outputs of the switching actions of the R/W signal generating circuit of the address supplier 7.

(Step S1)

Since the outputs of the P1 and P2 ports 15 and 16 are both 0, the control inputs to the JK flip-flop FF-1 (FIG. 2) are K=1 and J=0, respectively, so that the output Q is 0 (reset state). Under this state, even if a clock signal is input to the input T, because the control inputs are K=1 and J=0, the FF-1 does not change its output Q due to the characteristics of the JK flip-flop.

The characteristics of the JK flip-flop adopted as the FF-1 are such that when both the J and K inputs are 1, the JK flip-flop changes the state of output Q, and when K=0 and J=1, the output Q goes to a 1 state at the clock input, and when K=1 and J=0, the output Q goes to a 0 state at the clock input.

Because AND1 is on and AND2 is off and OR1 is on, the address bus 13 is connected through the second memory address line 20 to the second memory 3.

Furthermore, because AND3 is on and AND4 is off and OR2 is on, the R/W signal line 14 (FIG. 3) is connected through the second memory address line 19 (FIG. 3) to the second memory 3.

(Step 2)

Because the output of the P1 port 15 is "0" and the output of the P2 port 16 is "1", the control inputs to the flip-flop FF-1 (FIG. 2) are K=1 and J=1, the output Q is 1. Under this state, when a clock is input from the clock generator 8 to the input T, because the control inputs K and J are 1, the JK flip-flop changes the state of the output Q, and by using this function, the JK flip-flop increments the address from address 0 onwards in step with the clock pulse.

Since AND1 is off and AND2 is on and OR1 is on, the address bus 13 is separated from the second memory 3, and the output of FF-1 supplied through the second memory address line 20 to the second memory 3.

Since AND3 is off and AND4 is on and OR2 is on, the R/W signal line 14 (FIG. 3) is separated from the second memory 3. On the other hand, the second memory 3 is connected to the external R/W signal connection terminal 11 through the second memory R/W signal line 19 (FIG. 3).

This is a state that makes it possible to perform a multitask process that the address supplier 7 accesses the external device 30 to obtain data and transfers it to the second memory 3.

(Step S3)

Since the output of the P1 port 15 is "1" and the output of the P2 port 16 is "0", the control inputs to the JK flip-flop FF-1 (FIG. 2) are K=0 and J=0, so that the output is Q=1. Under this state, even when a clock pulse reaches the input T, since K=0 and J=0, the JK flip-flop does not change the outputs.

Because AND1 is on and AND2 is off and OR1 is on, the address bus 13 is connected to the second memory 3 through the second memory address line 20.

Furthermore, since AND3 is on and AND4 is off and OR2 is on, the R/W signal line 14 (FIG. 3) is connected to the second memory 3 through the second memory R/W signal line 19 (FIG. 3).

Under this state, the first bus switch 4 is on and second bus switch 5 is off, and therefore the second memory 3 is separated from the external device 30 and connected to CPU1.

Hence, it is possible to access data in the second memory 3, which has been transferred from the external device 30. (Step S4)

This is an operation stage of returning to the reset state, same as the state in Step S1.

According to the present invention, the multitask-process memory is connected switchably to the address bus and the data bus of CPU or the external device, and address supply means is provided which supplies address signals by which to store data from the external device into the memory. Therefore, the present invention offers the following effects.

1. The present invention provides a less expensive microcontroller which obviates the need to adopt an expensive device, such as a dual port RAM, and which can simplify the circuit configuration.

2. Since address signals are supplied at the same frequency as the clock frequency of the external device operation, it becomes easy to achieve interfacing with an external device which operates at a processing speed different from that of CPU.

What is claimed is:

1. A microcontroller having a memory connected to a CPU through a data bus and an address bus, comprising:

a memory for a multitask process separate from said memory;

data bus switching means for switching, by control of said CPU, the connection of said multitask-process memory either to said data bus or a data bus leading to an external device;

address bus switching means for switching, by control of said CPU, the connection of said multitask-process memory either to said address bus or to an address bus for said external device; and address supply means for generating and supplying address signals used to store data sent from said external device in the multitask-process memory connected both to the data bus of said external device and said address bus data.

2. A microcontroller according to claim 1, wherein said address supply means is connected to a clock oscillator which oscillates at the same clock frequency as the clock frequency of said external device.

* * * * *